(12) United States Patent
Harteneck et al.

(10) Patent No.: US 11,082,139 B2
(45) Date of Patent: Aug. 3, 2021

(54) MOBILE RADIO TESTING DEVICE AND METHOD FOR PROTOCOL TESTING

(71) Applicant: Rohde & Schwarz GmbH & Co. KG, Munich (DE)

(72) Inventors: Moritz Harteneck, Munich (DE); Martin Oetjen, Groebenzell (DE); Rolf Lorenzen, Taufkirchen (DE); Matthias Jelen, Munich (DE); Henry Gropp, Munich (DE); Heino Gerlach, Munich (DE); Gottfried Holzmann, Zorneding (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 100 days.

(21) Appl. No.: 16/588,759

(22) Filed: Sep. 30, 2019

(65) Prior Publication Data

US 2020/0358542 A1 Nov. 12, 2020

(30) Foreign Application Priority Data

May 6, 2019 (EP) .................................... 19172697

(51) Int. Cl.
*H04B 17/345* (2015.01)
*H04L 12/26* (2006.01)

(52) U.S. Cl.
CPC ......... *H04B 17/345* (2015.01); *H04L 43/045* (2013.01)

(58) Field of Classification Search
CPC .............................. H04B 17/345; H04L 43/045
USPC ........................................................ 370/252
See application file for complete search history.

(56) References Cited

U.S. PATENT DOCUMENTS

| 4,555,806 A * | 11/1985 | Lange ....................... H04L 1/20 455/62 |
| 7,366,508 B2 | 4/2008 | Hasegawa et al. |
| 2002/0090962 A1 | 7/2002 | Struhsaker et al. |
| 2005/0048922 A1 | 3/2005 | Lee et al. |
| 2005/0107080 A1 | 5/2005 | Hasegawa et al. |
| 2007/0155401 A1 | 7/2007 | Ward et al. |
| 2008/0130790 A1 | 6/2008 | Forenza |
| 2008/0320250 A1 | 12/2008 | Rofougaran et al. |

(Continued)

FOREIGN PATENT DOCUMENTS

CN        1912897 A     2/2007
CN      101291503 A    10/2008

(Continued)

OTHER PUBLICATIONS 1712.03987.pdf (Year: 2017).*
1703.00737.pdf (Year: 2017).*

*Primary Examiner* — Yemane Mesfin
*Assistant Examiner* — Intekhaab A Siddiquee
(74) *Attorney, Agent, or Firm* — Potomac Technology Law, LLC

(57) ABSTRACT

A mobile radio testing device for protocol testing of a device under test is provided. The mobile radio testing device comprises a downlink path and an uplink path, wherein the uplink path comprises at least a first analysis mode and a second analysis mode. In this context, the mobile radio testing device includes a demodulation processing unit for analyzing signals from the device under test in the first analysis mode. In addition, the second analysis mode analyzes signals from the device under test without using the demodulation processing unit.

15 Claims, 4 Drawing Sheets

(56) References Cited

U.S. PATENT DOCUMENTS

| | | | |
|---|---|---|---|
| 2011/0136439 A1* | 6/2011 | Tan | H04W 24/08 |
| | | | 455/67.11 |
| 2013/0114658 A1 | 5/2013 | Davydov et al. | |
| 2013/0158934 A1* | 6/2013 | Lee | H04L 43/50 |
| | | | 702/122 |
| 2013/0242720 A1 | 9/2013 | Chou | |
| 2013/0301548 A1 | 11/2013 | Etemad | |
| 2014/0119421 A1* | 5/2014 | El-Hassan | H04B 17/29 |
| | | | 375/227 |
| 2014/0153482 A1 | 6/2014 | Schmidt et al. | |
| 2016/0113003 A1 | 4/2016 | Lyons | |
| 2020/0213883 A1* | 7/2020 | Kong | H04B 17/0087 |

FOREIGN PATENT DOCUMENTS

| | | |
|---|---|---|
| CN | 101388970 A | 3/2009 |
| CN | 102421133 B | 4/2012 |
| CN | 103338086 A | 10/2013 |
| CN | 104597862 A | 5/2015 |
| FI | 20126147 | 5/2013 |
| FI | 20136094 | 11/2013 |
| FR | 2741159 A1 | 5/1997 |
| IL | 107908 A | 1/1997 |
| IT | MI20130394 A1 | 9/2013 |
| JP | 2010103753 A | 5/2010 |
| KR | 19980058285 A | 9/1998 |
| KR | 20010087608 A | 3/2000 |
| KR | 20020081619 A | 4/2003 |
| KR | 20030054311 A | 9/2004 |
| KR | 101899381 B1 | 10/2018 |
| OA | AP/P/96/00832 A | 9/1998 |
| WO | WO9849850 A1 | 11/1998 |
| WO | WO0130003 A1 | 4/2001 |
| WO | WO2006031091 A1 | 3/2006 |
| WO | WO2006096886 A1 | 9/2006 |
| WO | WO2006111975 A1 | 10/2006 |
| WO | WO2010000110 A1 | 1/2010 |
| WO | WO2010014805 A1 | 2/2010 |
| WO | WO2019032813 A1 | 2/2019 |

* cited by examiner

MOBILE RADIO TESTING DEVICE AND METHOD FOR PROTOCOL TESTING

RELATED APPLICATIONS

This application claims priority under 35 U.S.C. § 119(a) from European Patent Application No. 19172697.5 (filed 2019 May 6), the entirety of which is incorporated by reference herein.

TECHNICAL FIELD

The invention relates to a mobile radio testing device and a corresponding method for protocol testing of a device under test, especially for analyzing interference situation of the test environment.

BACKGROUND

Over the air (OTA) tests are required by many standard organizations to accurately predict real world wireless device reliability. To ensure error free reception of the test signals, the interference situation of the test environment is required to be investigated. Furthermore, most network operators will implement fifth generation (5G) mobile communications as an additional channel to further increase transmission rates. For instance, an implementation of the 5G New radio (NR) to extend the existing Long Term Evolution (LTE) networks would significantly improve data throughput rates. The simultaneous network connection requires wide reception of signals for testing the signaling, radio frequency parameters, data rates and the like. Such wide reception of test signals is susceptible to interferences that can be generated by transmission of the test equipment itself or by other sources in the vicinity of the test equipment such as Wireless Local Area Network (WLAN) hotspots, Digital Enhanced Cordless Telecommunications (DECT) stations and so on.

Currently a spectrum analyzer, which is connected to an antenna, is utilized to check the interference situation of the test environment. However, the receive signal at the spectrum analyzer may differ with the actual input signal into the receiver due to, for instance the position and the direction of the corresponding antennas. Additional hardware such as the spectrum analyzer and/or separate antennas also require a larger and cost intensive test setup. Therefore, it would be more appropriate to monitor the actual input signal into the receiver to effectively analyze the interference situation of the test environment.

For example, U.S. Pat. No. 7,366,508 B2 discloses a radio access point testing method and testing apparatus which permit the radio characteristics test of a radio access point apparatus in a mobile communication system by remote manipulation from an operation center.

Accordingly, there is a need for protocol testing of a device under test which further analyze the interference situation of the test environment in a highly efficient and cost effective manner to ensure error free reception at high data rates.

SUMMARY

Embodiments of the present invention advantageously address the foregoing requirements and needs, as well as others, by providing approaches for protocol testing of a device under test which further analyze the interference situation of the test environment in a highly efficient and cost effective manner to ensure error free reception at high data rates.

According to a first aspect of the invention, a mobile radio testing device for protocol testing of a device under test is provided. The mobile radio testing device comprises a downlink path and an uplink path, wherein the uplink path comprises at least a first analysis mode and a second analysis mode. In this context, the mobile radio testing device includes a demodulation processing unit for analyzing signals from the device under test in the first analysis mode. In addition, the second analysis mode analyzes signals from the device under test without using the demodulation processing unit. Therefore, protocol testing of the device under test is carried out along the first analysis mode by demodulating the receive signal according to the standards such as LTE, NR and the like. Additionally, the receive signal is further analyzed along the second analysis mode, where the modulated version of the receive signal is evaluated for investigating radio frequency interferences. In other words, the first analysis mode is configured to perform protocol testing and the second analysis mode is configured to perform radio frequency testing on the same receive signal from the device under test. Advantageously, the actual receive signal in the receiver is analyzed for investigating the interference situation of the test environment.

According to a first preferred implementation form of said first aspect of the invention, the first analysis mode and the second analysis mode are configured to operate simultaneously. The second analysis mode might have a wider bandwidth than the first analysis mode. Advantageously, protocol testing and radio frequency testing are performed simultaneously. In addition, the wide bandwidth of the second analysis mode facilitates an extensive reception of test signals, especially for simultaneous network connection.

According to a second preferred implementation form of said first aspect of the invention, the second analysis mode includes spectrum analyzing means. Additionally or alternatively, the second analysis mode is configured to detect radio frequency interferences. Advantageously, no additional spectrum analyzer and/or antenna arrangement are required, which leads to a simple and cost effective test setup.

According to a further preferred implementation form of said first aspect of the invention, the second analysis mode is further configured to classify the detected radio frequency interferences with respect to a pattern dataset. The classification can be based on selective strategies, for instance technology identification, modulation type recognition, interference source detection and so on. These data then can be advantageously utilized to train the testing device to effectively analyze the interference situation of the test environment.

According to a further preferred implementation form of said first aspect of the invention, the mobile radio testing device further comprises communication means to communicate with the device under test wirelessly or via cable, preferably with frequencies above 6 GHz or millimeter waves. Advantageously, spectrum bands above 6 GHz comprise large blocks of spectrum that are particularly suitable for 5G mobile communications.

According to a further preferred implementation form of said first aspect of the invention, the communication means is configured to deactivate the device under test before analyzing in the second analysis mode and to activate the device under test after analyzing in the second analysis mode. Advantageously, testing accuracy is significantly improved.

According to a further preferred implementation form of said first aspect of the invention, the mobile radio testing device further comprises a graphical user interface, configured to display results from the first analysis mode and the second analysis mode simultaneously, preferably in parallel. Advantageously, analyzing the test results and switching of the analysis modes are performed with ease through direct manipulation of the graphical elements.

According to a further preferred implementation form of said first aspect of the invention, the graphical user interface is further configured to indicate a specific source of radio frequency interferences based on the classification of radio frequency interferences from the second analysis mode. Advantageously, testing accuracy is further improved.

According to a further preferred implementation form of said first aspect of the invention, the graphical user interface is further configured to control a signal transmission in the downlink path. Therefore, a selective interference can be generated through the downlink path that can be acted on the receive signal from the device under test. Advantageously, the behavior of the device under test under a particular interference situation can be effectively analyzed.

According to a second aspect of the invention, a method for protocol testing of a device under test is provided. The method comprises the steps of analyzing signals from the device under test in a first analysis mode including a demodulation processing step and analyzing signals from the device under test in a second analysis mode excluding the demodulation processing step. Advantageously, the first analysis mode is configured to perform protocol testing and the second analysis mode is configured to perform radio frequency testing on the same receive signal from the device under test. Therefore, the actual receive signal in the receiver is analyzed for investigating the interference situation of the test environment.

According to a first preferred implementation form of said second aspect of the invention, the method further comprises the step of operating the first analysis mode and the second analysis mode simultaneously. Advantageously, protocol testing and radio frequency testing are performed simultaneously.

According to a second preferred implementation form of said second aspect of the invention, the method further comprises the step of detecting radio frequency interferences in the second analysis mode. Advantageously, no additional spectrum analyzer and/or antenna arrangement are required, which leads to a simple and cost effective test setup.

According to a further preferred implementation form of said second aspect of the invention, the method further comprises the step of classifying the detected radio frequency interferences with respect to a pattern dataset in the second analysis mode. The classification can be based on selective strategies, for instance technology identification, modulation type recognition, interference source detection and so on. These data then can be advantageously utilized to train the testing device to effectively analyze the interference situation of the test environment.

According to a further preferred implementation form of said second aspect of the invention, the method further comprises the step of indicating a specific source of radio frequency interferences based on the classification of radio frequency interferences from the second analysis mode. Advantageously, testing accuracy is significantly improved.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

A device and a method for protocol testing of a device under test, which further analyze the interference situation of the test environment in a highly efficient and cost effective manner to ensure error free reception at high data rates, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in computer memory storage.

Reference will now be made in detail to the embodiments of the present invention, examples of which are illustrated in the accompanying drawings. However, the following embodiments of the present invention may be variously modified and the range of the present invention is not limited by the following embodiments.

Figure 1:
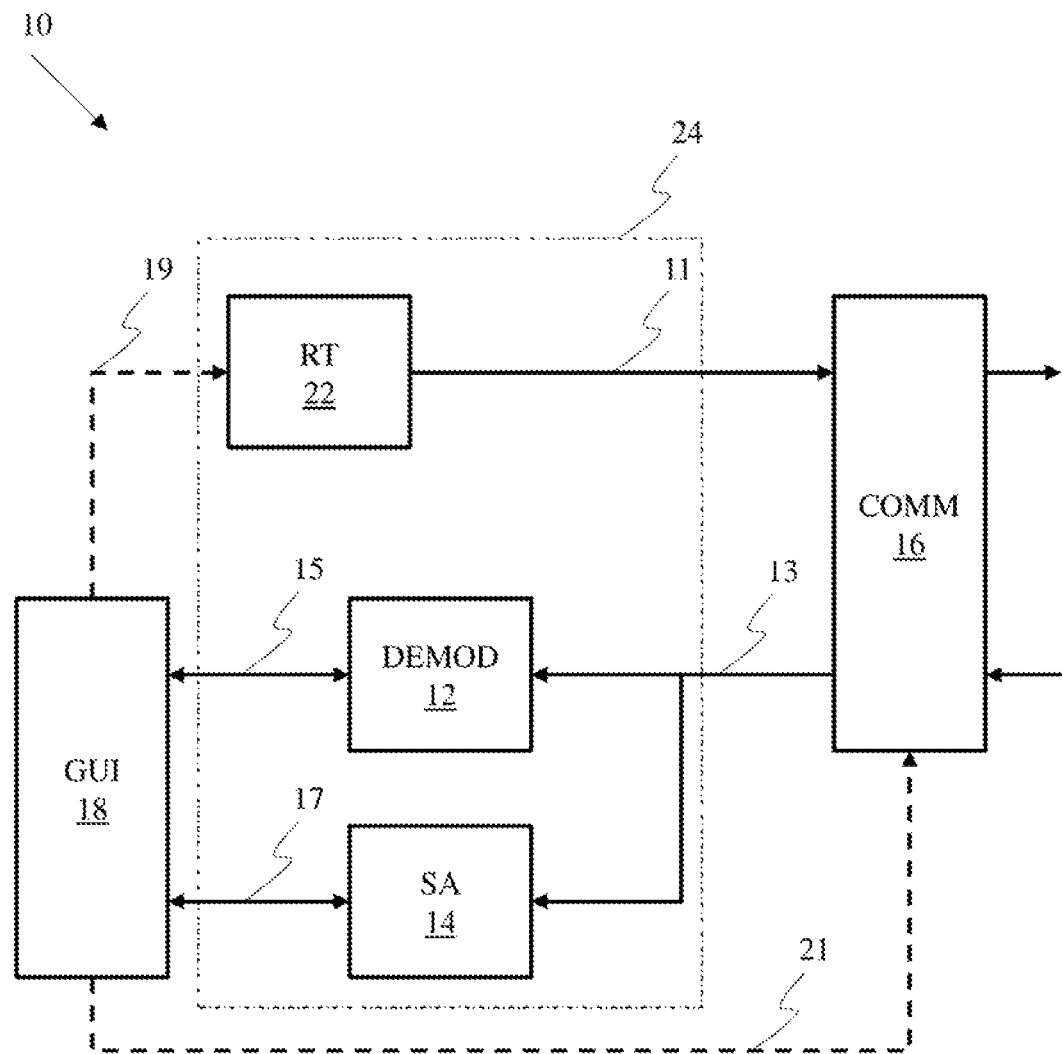
FIG. 1 shows a block diagram of the mobile radio testing device according to the first aspect of the invention.

In FIG. 1, a block diagram of the inventive mobile radio testing device 10 according to the first aspect of the invention is illustrated. The mobile radio testing device 10 comprises a downlink path 11 and an uplink path 13. The downlink path 11 comprises a radio transmission block 22 that outputs radio frequency signals preferably above 6 GHz or millimeter wave frequency range. The uplink path 13 comprises a first analysis mode 15 and a second analysis mode 17. The uplink signal from a device under test 20, which is not shown in FIG. 1, is demodulated along the first analysis mode 15 through a demodulation processing unit 12 based on the protocol stack to be tested according to the standards such as LTE, NR and so on. The said uplink signal is further analyzed along the second analysis mode 17 through a spectrum analyzing means 14 where the modulated version of the receive signal is investigated for radio frequency interferences. The mobile radio testing device 10 also comprises communication means 16 through which the downlink path 11 and the uplink path 13 are connected to the device under test 20.

Furthermore, the mobile radio testing device 10 comprises a graphical user interface 18 which displays results from the first analysis mode 15 and the second analysis mode 17 on one screen preferably in parallel. The graphical user interface 18 controls the communication means 16 via signal line 21 such that the device under test 20 is deactivated before analyzing in the second analysis mode 17 and is activated after analyzing in the second analysis mode 17 to provide controlled interruption for frequency analysis of the received signal. The graphical user interface 18 further configures the radio transmission block 22 via signal line 19 in order to generate a specific downlink signal along the downlink path 11. Preferably, the graphical user interface 18 comprises menu based interfaces and direct manipulation interfaces so as to facilitate the users to configure the testing device 10 to meet their specific requirements in diverse test circumstances.

Figure 2A:
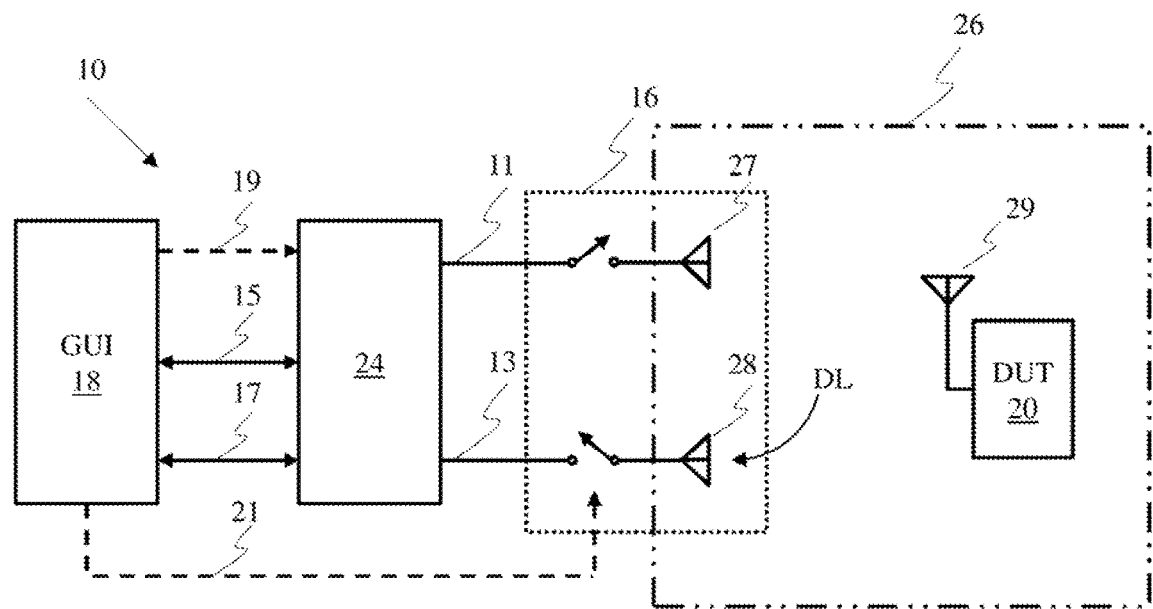
FIG. 2a shows a first exemplary test setup for the mobile radio testing device.

In FIG. 2a, a first exemplary test setup for the mobile radio testing device 10 is illustrated. In this context, the mobile radio testing device 10 is wirelessly connected with a device under test 20 through the communication means 16. The communication means 16 comprises a downlink antenna 27, an uplink antenna 28 and switching arrangements that are digitally controlled by the graphical user interface 18 via the signal line 21.

Additionally or alternatively, the communication means 16 comprises radio frequency connectors along with switching arrangements to communicate with the device under test 20 via radio frequency cables, for instance coaxial cable, twisted pair cable and the like.

The device under test 20 comprises an antenna 29, preferably a transceiver and is placed in an OTA test chamber 26 for wireless testing in controlled electromagnetic environment. The OTA test chamber 26 preferably supports all millimeter wave frequency bands that are considered for 5G communication. The radio transmission block 22 transmits protocol stacks to be tested to the device under test 20 and the respective uplink signal is analyzed along the first analysis mode 15. Additionally, users can configure the downlink signal through the graphical user interface 18 to produce specific interference to the uplink signal to observe the behavior of the device under test 20 for a selective interference situation of the test environment along the second analysis mode 17.

Figure 2B:
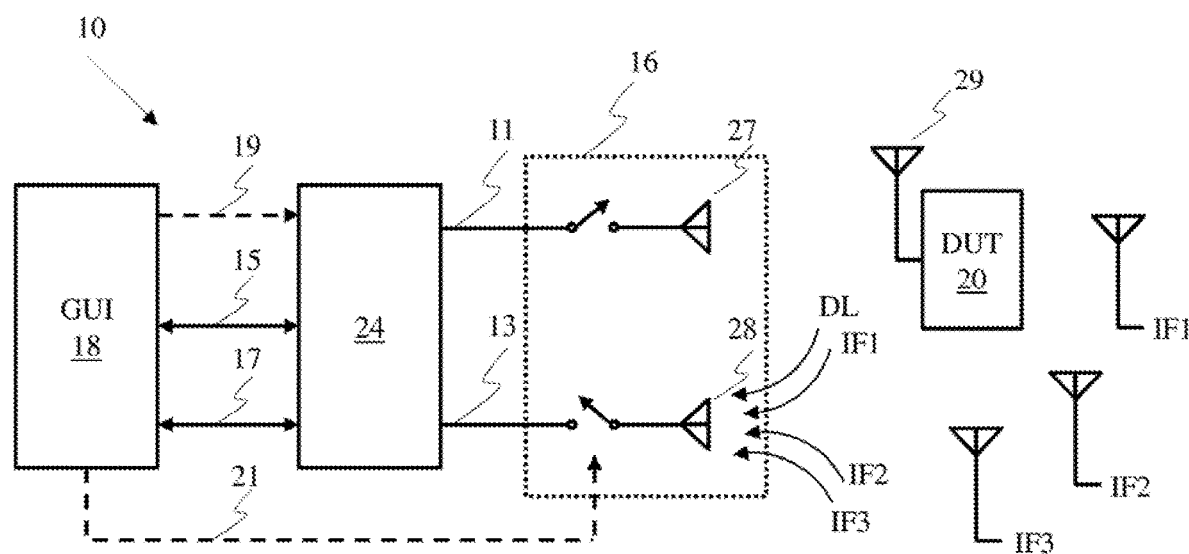
FIG. 2b shows a second exemplary test setup for the mobile radio testing device.

In FIG. 2b, a second exemplary test setup for the mobile radio testing device 10 is illustrated. The said test setup differs from the first test setup according to FIG. 2a in that the OTA test chamber 26 is not present and the device under test is placed in an open-air test area surrounded by interfering sources IF1, IF2, IF3. The interfering sources IF1, IF2, IF3 can be defined as, for example, WLAN hotspots, DECT stations, other mobile networks and the like. Such non-coherent interfering sources IR1, IR2, IR3 as well as the interfering downlink signal are detected in the spectrum analyzing means 14 along the second analysis mode 15. The second analysis mode 15 effectively classifies the detected interfering sources IF1, IF2, IF3 with respect to a pattern dataset based on the technology, modulation type and so on. The graphical user interface 18 indicates the interfering sources IF1, IF2, IF3 on the screen and marks the interfering sources IF1, IF2, IF3 according to the classifications from the second analysis mode 17.

Figure 3A:
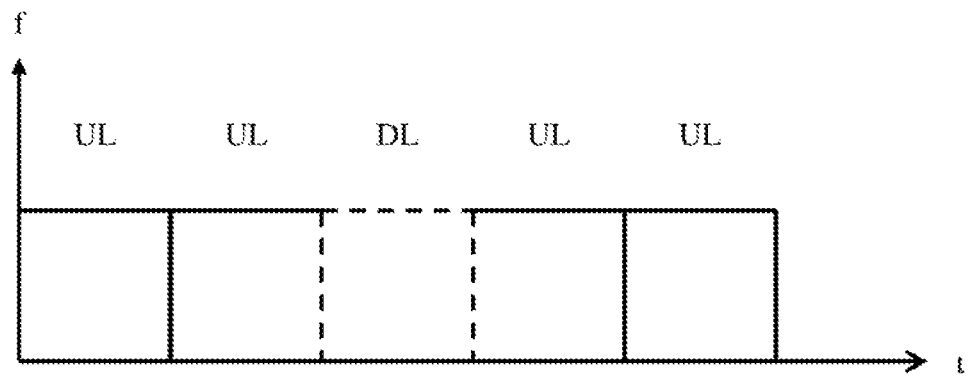
FIG. 3a shows an interference situation in the uplink receive train by way of example.

In FIG. 3a, an interference situation in the uplink receive train is illustrated by way of example. With respect to the test setup, where the device under test 20 is placed in an OTA test chamber 26, interferences in the uplink signal is limited to the downlink signal in most cases. Such an interference situation is shown along FIG. 3a where the mobile radio testing device 10 captures uplink data train from the device under test 20 which comprises interfering downlink data. Additionally, other interfering sources can be deliberately placed within the OTA test chamber 26 to observe the respective behavior of the device under test 20 in a controlled interference situation of the test environment.

Figure 3B:
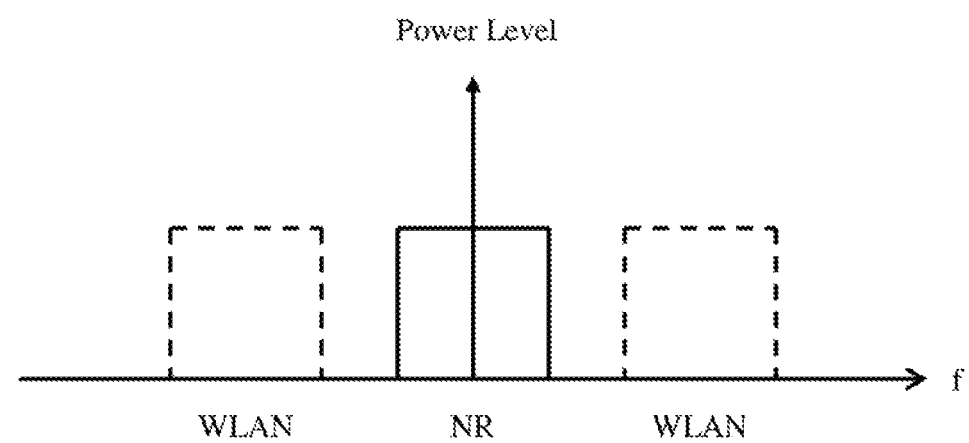
FIG. 3b shows an interference situation in the uplink signal frequency spectrum by way of example.

In FIG. 3b, an interference situation in the uplink signal frequency spectrum is illustrated by way of example. With the addition of new frequencies and signaling forms, 5G communication is more susceptible to interference from other wireless services since most of the frequency bands operate in the same or in adjacent spectrum to other wireless communication systems. Such an example is shown along FIG. 3a where an active new radio (NR) carrier is congested by adjacent wireless local area network (WLAN) carriers. Particularly in the open-air test setup, which simulates closest to the real world usage scenario of the device under test 20, is not essentially limited to one WLAN source but also vulnerable to unsuspected carriers from other wireless communication systems.

Figure 4:
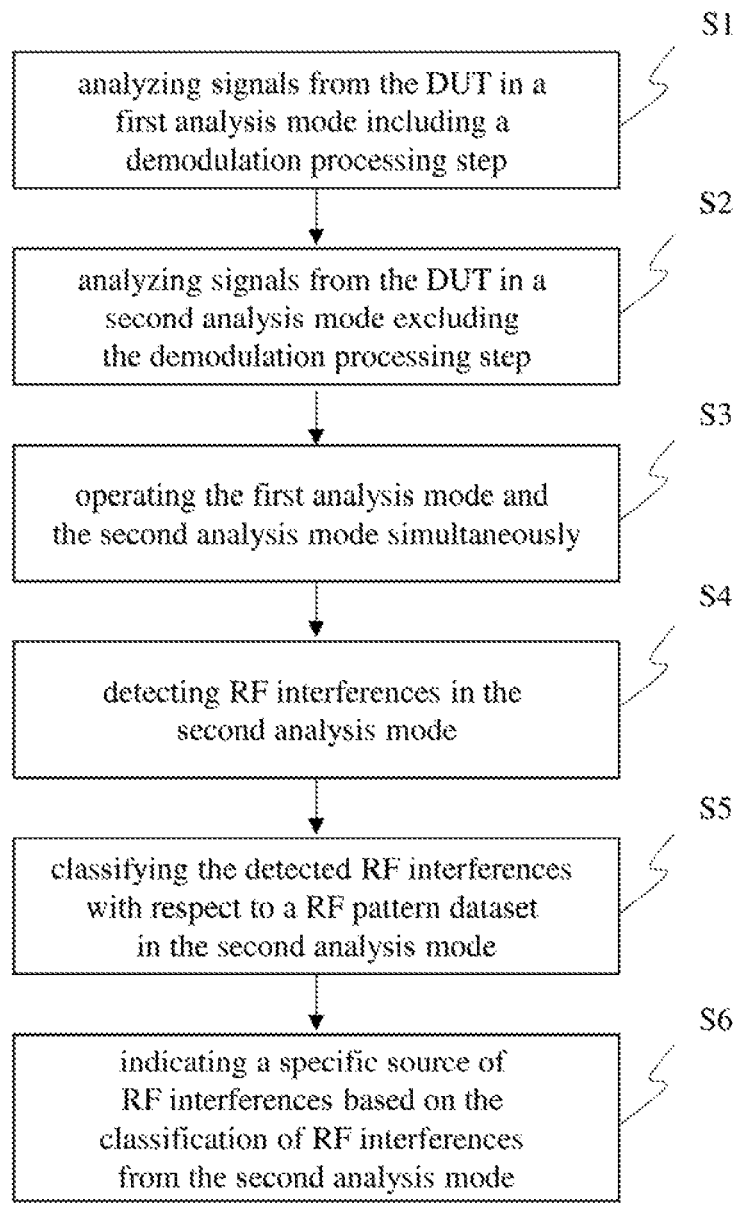
FIG. 4 shows a flow chart of an exemplary embodiment of the second aspect of the invention.

In FIG. 4, a flow chart of an exemplary embodiment of the inventive method according to the second aspect of the invention is illustrated. In a first step S1, signals from the device under test are analyzed in a first analysis mode that includes a demodulation processing step. In a second step S2, signals from the device under test are analyzed in a second analysis mode that excludes the demodulation processing step. In a third step S3, the first analysis mode and the second analysis mode are operated simultaneously.

Furthermore, in a fourth step S4, radio frequency interferences are detected in the second analysis mode. In a fifth step S5, the detected radio frequency interferences are classified with respect to a pattern dataset in the second analysis mode.

Finally, in a sixth step S6, a specific source of radio frequency interferences is indicated based on the classification of radio frequency interferences from the second analysis mode.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A mobile radio testing device for protocol testing of a device under test, comprising:
    a downlink path and an uplink path, wherein the uplink path comprises at least a first analysis mode and a second analysis mode;
    a switching device configured to be operated via a signal line to switch the analysis modes, wherein the switching of the analysis modes is digitally controlled via a graphic user interface; and
    a demodulator configured to analyze signals from the device under test in the first analysis mode; and
    wherein the second analysis mode is configured to analyze signals from the device under test without using the demodulator.

2. The device according to claim 1, wherein the first analysis mode and the second analysis mode are configured to operate simultaneously.

3. The device according to claim 1, wherein the second analysis mode has a wider bandwidth than the first analysis mode.

4. The device according to claim 1, wherein the second analysis mode includes spectrum analyzing means and/or wherein the second analysis mode is configured to detect radio frequency interferences.

5. The device according to claim 4, wherein the second analysis mode is further configured to classify the detected radio frequency interferences with respect to a pattern dataset.

6. The device according to claim 1, further comprising:
    a communication unit configured to communicate with the device under test wirelessly or via cable, preferably with frequencies above 6 GHz or millimeter waves.

7. The device according to claim 6, wherein the communication means is configured to deactivate the device under test prior to the analysis in the second analysis mode and to activate the device under test after the analysis in the second analysis mode.

8. The device according to claim 1, wherein the graphical user interface is configured to display results from the first analysis mode and the second analysis mode simultaneously.

9. The device according to claim 8, wherein the graphical user interface is further configured to indicate a specific source of radio frequency interference based on a classification of radio frequency interference from the second analysis mode.

10. The device according to claim 8, wherein the graphical user interface is further configured to control a signal transmission in the downlink path.

11. A method for protocol testing of a device under test, comprising:
    receiving signals from the device under test via an uplink path, wherein the uplink path comprises at least a first analysis mode and a second analysis mode;
    analyzing the signals from the device under test in the first analysis mode including a demodulation processing;
    analyzing the signals from the device under test in the second analysis mode excluding the demodulation processing; and
    switching the analysis modes, by a switching device operated via a signal line, wherein the switching of the analysis modes is digitally controlled via a graphic user interface.

12. The method according to claim 11, further comprising:
    operating the first analysis mode and the second analysis mode simultaneously.

13. The method according to claim 11, further comprising:
    detecting radio frequency interference in the second analysis mode.

14. The method according to claim 13, further comprising:
    classifying the detected radio frequency interference with respect to a pattern dataset in the second analysis mode.

15. The method according to claim 11, further comprising:
    indicating a specific source of radio frequency interference based on a classification of radio frequency interference from the second analysis mode.

* * * * *